Patented July 31, 1945

2,380,456

UNITED STATES PATENT OFFICE 2,380,456

ART OF PROVIDING PROTECTIVE AND DECORATIVE LACQUERS AND COATINGS

Curtis E. Maier, Sylvester L. Flugge, and Edward C. Pfeffer, Chicago, Ill., assignors to Continental Can Company, Inc., New York, N. Y., a corporation of New York No Drawing. Application May 11, 1940, Serial No. 334,602

39 Claims. (Cl. 260—23)

This invention relates to the art of providing protective and decorative lacquers and coatings upon surfaces.

It has heretofore been a practice to employ coatings of vinyl resins (for example, such as are formed by the co-polymerization of vinyl chloride and vinyl acetate), but difficulty has been experienced because of the inability of these types of resins to adhere satisfactorily to metal and like surfaces. Coating compositions which rely upon such vinyl resins as a base cannot be successfully baked on most bare metal surfaces to obtain satisfactory adherent coatings, as the vinyl resin itself begins to decompose at such baking temperatures as are necessary to activate the molecules to obtain good adhesion.

Hence, it has been the custom in applying such vinyl resins to metal to first apply a sizing or undercoat to the metal surface to which the vinyl resin can then be applied and made to adhere by baking, without the usual decomposition of the vinyl resin. This requires two coating operations, and any imperfections in the base coat allow contact of the metal surface and the coating of vinyl resin permitting degradation or decomposition of the vinyl resin at such points during baking: even with all the precautions which can be taken in producing these two-coat enamelled metal surfaces, cleavage between the layers often occurs, either during fabrication or during subsequent use of the fabricated article. Finally, it is difficult to introduce pigments into a vinyl resin by ordinary ball mill, stone mill or roller mill grinding available in paint plants; and hence it has been found necessary not only to introduce solvent plasticizers into the vinyl resin pigment formulae; but also to use slower and more expensive rubber milling equipment and very careful control of the rubber mill grinding temperatures in cases where pigments are to be employed, because any overheating of the mills and the mere presence of the plasticizer itself results in a reduction of the strength and resistance of the vinyl coating.

It is known that most natural or synthetic resins including alkyd resins are capable of good adhesion to metal surfaces. In attempting the preparation of mixtures of natural resins or synthetic resins including alkyd resins with vinyl resins, it has been found that the coating produced is either too brittle or has lower water resistance than a coating of vinyl resin alone, so that blush results upon contact with moisture at the elevated pasteurizing or sterilizing temperatures, which is the normal condition such coatings must withstand when they are employed in containers for foodstuffs, etc. When more than 10 percent of a varnish resin is provided in mixture with vinyl resin, the film is so brittle that bending and drawing operations cause metal exposure, while the use of lesser quantities does not effect the necessary adhesion. Drying oils can produce a tight, adhesive and continuous coating on metal surfaces but generally are not directly compatible with such vinyl resins, and hence mixtures thereof in appropriate solvents tend to segregate either before or during the course of drying by evaporation of solvent, so that the final coating is not compatible and does not have the good characteristics of either the vinyl resin or of the drying oil. Hence, difficulty has been encountered in preparing a simple coating which has the merits of oleo-resinous varnishes in proper adhesion to the base metal and of the vinyl resins in providing an external surface which is non-brittle, flexible, tough, strong and resistant to atmospheric conditions and to the attack of acids, alkalies, oils, alcohols, etc., such as are present in foodstuffs, for example.

It has now been found that excellent single-coating compositions and protective films may be prepared by effecting compatibility of certain vinyl resins and oleo-resinous varnishes by preparing the oleo-resinous varnish in such manner that it attains a stage of compatibility with the selected vinyl resin whereby a single coating may be employed upon a metal, and wherein the components of this coating have a differential concentration effect and tend to assume preferred positions with respect to the metal, so that the final film consists essentially of oleo-resinous matter adjacent the metal, and essentially of the vinyl resin at the exposed surface. In particular, this result is attained by effecting an interassociation and apparent bonding of the components of the oleo-resinous varnish, so that the mutual solubility of the varnish resin in the oil and the vinyl resin makes the interassociated oleo-resinous varnish reaction product compatible with the vinyl resin.

The vinyl resin selected should have the proper characteristics of resistance to chemical and mechanical influences; and we have found that vinyl resins produced by the polymerization of vinyl chloride, or by co-polymerization of vinyl chloride and vinyl acetate, or by appropriate mixing of separately polymerized vinyl chloride and vinyl acetate, are suitable for employment. In general, the selected vinyl resin consists at least in part of a polymerized vinyl halide, and may include also a separately or co-polymerized vinyl ester. The corresponding vinylidene compounds may be employed. These resins may be regarded as having the general formula of $(CH_2:CAX)_n$, in which A must be at least in part a halogen but may consist in part of an acid radical and X is hydrogen or halogen, while $n$ denotes the polymerization of the individual monomers to form the resin. They can thus be regarded as the polymer resins formed by mono- (vinyl) and unsymmetrical di- (vinylidene) substituted ethylenes, in which halogen substitution has occurred in part. All these compounds have poor adhesion to metal surfaces.

Theoretically, various organic compounds are considered as being polar in their composition, ranging from a polar neutral condition to strongly polar-negative. This polar condition is revealed by a dipole moment corresponding to the specific attraction or repulsion of electric charges upon or in the particular molecules, and appears as a function of the orientation of the particular molecules, and of the unsymmetrical arrangement of the positive and negative groupings thereof about a center. The degree of positive polarity of the different metals is correlated with the apparent electro-chemical potential of the particular metal. All common natural resins and the synthetic resins of the phenol-formaldehyde, coumarone-indene, alkyd, and hydrocarbon types are strongly polar-negative, as well as the films formed by drying or semi-drying oils, and the combinations of oleo-resinous varnish bases formed as stated above; while the aforesaid selected vinyl resins are relatively weakly polar-negative. Hence, it may be assumed that the attraction between a polar-negative oleo-resin and a polar-positive metal represents an excellent adhesion between the coating and the metal by reason of the electrical charges involved: conversely, the selected vinyl resins are only slightly polar-negative, and only little attraction is present so that proper adhesion is not attained. According to the present invention, therefore, an oleo-resinous varnish is employed in combination with the selected vinyl resin, which oleoresinous varnish component affords a surface to which the selected vinyl resins may firmly adhere in such quantity that the oleoresinous varnish satisfies the polar-positive charges of the metal, thus producing excellent adhesion typical of oleo-resinous varnishes. Furthermore, by presenting conditions under which migration of individual molecules is possible in the coating on the metal, the oleo-resinous molecules preferentially migrate toward the metal by reason of the selective polar attraction, whereas the vinyl resin molecules are not so attracted, and preferentially move outward. Hence, the final film comprises a preponderance of oleo-resinous varnish base adjacent the metal, and a preponderance of vinyl resin at the outer surface.

According to the present invention, a coating composition is prepared from four primary ingredients, comprising (1) an oil of drying or semi-drying type; (2) a natural or synthetic oil-soluble varnish resin; (3) a vinyl polymer resin of the aforesaid selected type; (4) a solvent or other dispersing agent volatile under the conditions of application. Further, (5) coloring matter may be incorporated. These individual ingredients may be selected from groups of commercially available materials.

The composition may be used for coating in various ways, such as by roller, printing, dipping, spraying, and brushing operations. It is preferred to employ such dilution by means of the selected solvents, with a proper viscosity, that total solids are present for assuring a coating of the desired thickness by a single application, in order that the differential concentration or stratification effects of the interassociated oleo-resinous varnish and of the selected vinyl resin may occur to the greatest advantages for the particular employment.

The selection of proportions of oleo-resinous varnish to vinyl resin depends partly upon the character and type of metal surface, and partly upon the character and thickness of the total film desired. With tinplate of normal smoothness, the quantity of oleo-resinous varnish solids should exceed five percent, in order to assure a proper protection against burning of the vinyl resin and to assure a proper adhesion to the metal: but preferably does not exceed fifty percent, as a large excess of oleo-resinous varnish over that required for proper adhesion to the metal and to the selected vinyl resin components represents material which is superfluous, so to speak, and does not partake in the differential stratification, and hence remains with the vinyl resin and lowers the normal high resistance of the external surface provided by the vinyl resin. With clean steel plate, a relatively greater quantity of the oleo-resinous varnish component is desirable than with tinplate, owing to the different metal base and to the usually greater roughness of the surface of such steel plate as compared with the smoothness of surface of tinplate.

Further, as a general rule, the thinner the total film desired, the higher should be the precentage of the oleo-resinous varnish solids employed. These coatings have been employed to give dry film weights as high as six milligrams per square inch, which represents a strong and highly resistant coating, and is correspondingly expensive due to the high cost of the vinyl resins. It has been found feasible to prepare excellent protective and decorative films with the employment of two milligrams of solid base material per square inch. In making one particular coating, with the inclusion of tinting matter and aluminum flakes, giving the appearance of golden metallic bronze lacquer, twenty percent of oleo-resinous varnish solids was found excellently adapted for employment. For a given metal base in a given condition of roughness, it has been found that substantially the same quantity of oleo-resinous varnish solids per unit surface can be successfully employed, as its major function is that of bonding with the metal surface and also with the differentially concentrated or stratified vinyl resin.

The proportion of oleo-resinous varnish to be employed with a particular metal appears to be in direct proportion to the electrochemical potential of such metal, having due regard to the surface condition by way of roughness, presence of oxide, etc., as such conditions appear to modify the action of the surface in protecting the various components or in effecting a deteriorative catalysis thereof upon heating. Further, the bonding effect varies with the particular oleo-resinous varnish selected: and apparently this variation is a direct function of the available polar charges for saturating or neutralizing the opposite charges of the metal. That is, it is apparently necessary for the oleo-resinous varnish solids to be sufficient in quantity so that its polar charges are able to satisfy the metal, and still permit the vinyl resin top film to bond strongly and intimately with the oleo-resinous base film. Theoretically, it may be assumed that the action in the coating as applied is initially that of orientation, followed by migration.

This migration apparently begins while the solvent is still present in the coating, but apparently only a limited migration occurs under such conditions. Hence, the differential concentration or stratification produced by the migration is normally observed to increase largely after the solvents have been substantially eliminated, and continues after solvent evaporation has apparently been completed. That is, migration is occurring in the solid film itself. This migration apparently continues also during the early course of the baking operation, even after the film is no longer fluid, but the result of baking is apparently a fixing in place due to a change in the properties of the oleo-resinous film, so that the migration is thereafter prevented, and the baked film maintains the characteristics thus conferred upon it.

A feature of the present invention is the capability of employing a wide range of temperatures in baking the dried coating to produce a fixed final form. One function of this baking operation can be regarded as a continuation or completion of the normal cooking used in making the oleo-resinous varnish. Due to the aforesaid apparent migration, by which the oleo-resinous varnish components tend to concentrate at the metal surface while the vinyl resin components tend to form an external surface, the oleo-resinous varnish solids prevent direct contact of any substantial quantity of vinyl resin with the metal, whereby the baking operation does not cause any catalytic decomposition effect of the metal upon the vinyl resin, and hence a much higher temperature and greater range of temperature is permissible in this baking operation without objectionable deterioration of the vinyl resin components. It is well known that when resins produced by polymerization or co-polymerization of, for example, vinyl chloride and vinyl acetate are heated or baked at the relatively high temperature necessary to obtain adhesion of these resins to metal, decomposition results by which apparently the chlorine or acetic radical of the polymer reacts with the metal and produces a catalyst in the form of free acid which promotes further decomposition of the vinyl polymer: and this is essentially absent in the practice of the present procedure.

When pigment or coloring matter is employed, these can be ground or otherwise blended into the oleo-resinous varnish, and normal paint grinding equipment is excellently adapted for this purpose, in distinction from the necessity of employing dry grinding on a rubber mill when it is sought to disperse the pigments with vinyl resin. Among the coloring matters which may be employed are opaque pigments, transparent pigments, lakes and dyes. Of these, the lakes may be regarded as dyed pigments, and metallic bronzes of self-color or tinted-color are likewise regarded as pigments. By proper proportioning of the size of individual granules of pigment and by use of a proper grinding, there is no sedimentation and re-mixing is not required under normal conditions of storage and use. In the coating, drying and baking operations, the pigment appears to migrate with the oleo-resinous component, so that the pigment becomes seated close to the metal surface with the vinyl resin forming a tough upper surface so that there is double protection against change of color by whatever reactions that may take place with the products in contact with the film.

A wide variety of materials may be employed in selecting the several constituents.

(1) The drying oil constituent may be selected from unsaturated drying oils including (A) fast drying oils having 2 or more conjugated double bonds in the molecule, such as Chinawood oil, oiticica oil and dehydrated castor oil; (B) medium fast drying oils having 3 or more non-conjugated double bonds in the molecule, such as perilla oil, linseed oil, soy bean oil and the glycerides of the unsaturated fatty acids with 20 or 22 carbon atoms in the molecule including the glycerides of the clupanodonic acid of fish oils; (C) for some instances of employment, and with proper precautions, semi-drying oils having two non-conjugated double bonds in an acid radical thereof such as poppyseed, rapeseed, and sunflower seed oils.

(2) The varnish resin constituent must be capable of dissolving in and becoming interassociated with the drying oil during the course of preparation and must generally be compatible with the selected vinyl resin: and a selection may be made from: (A) oil-soluble 100 percent phenolic (i. e., phenol-aldehyde) resins including non-heat hardening varnish resins of the phenyl phenol type (illustratively the commercial product known as Bakelite BR 254) and other 100 percent phenolic type (illustratively Bakelite BR 4036 or BR 1329, Super-Beckacite 2000, Durez 550, Varcum 250, and Murphy #2), and heat-hardening 100 percent phenolic resins (illustratively Bakelite XR 3360, and Super-Beckacite 1001); (B) oil-soluble modified or resin-extended phenolic resins including heat-hardening phenolic oil-soluble varnish resins which have been modified with ester gum or rosin (illustratively Beckacite 1100 or 1101, Phenac 605–K, Amberol F–7 and Paranol 500); (C) oil-soluble natural resins and chemically or thermally-modified natural resins, including rosin such as W. W. grade, ester gum such as #1201 Resin, glycerol-esterified copals such as #500 Kopol, masticated copals such as #502 Kopol, fused copals such as #501 Kopol, phenolated copals such as #1400 Beckopol, hydrogenated rosin such as Staybellite resin, and pine stump resin such as Vinsol resin; (D) oil-soluble coumarone and indene resins (illustratively Soft Nevillac, Hard Nevillac, Nuba resin and Paradene) and oil-soluble hydrogenated coumarone and indene resins (illustratively Nevillite); (E) oil-soluble resinous reaction products of monomeric styrene and an oil-soluble phenol-aldehyde resin (illustratively Bakelite XRS–1 and XRS–2); (F) oil-soluble hydrocarbon resins obtained from polymerization of olefin-diolefin fractions of cracked petroleum distillates (illustratively, Santo resins #6 and #7) and oil-soluble dihydronaphthalene polymer resins (illustratively RH–35).

In setting out the above materials, it may be pointed out that the phenolic resins of the heat-hardening type have sometimes been termed "di-alcohol phenol" resins, and are condensation products of phenol and formaldehyde combined under the influence of alkaline catalysts, and react with neutral oils and resins. Other-heat-hardening and the non-heat-hardening phenolic resins have been termed the "complex phenol" resins and as a group consist of products of condensation of phenols with unsaturated hydrocarbons under the influence of an acid catalyst, and of these it is feasible to employ those which are oil-reactive or oil-soluble.

(3) The vinyl polymer resin component presently preferred is a co-polymerized resin consisting of approximately 85 percent vinyl chloride polymer and 15 percent vinyl acetate polymer; but co-polymers of these in other ratios may be used, as well as the physical mixtures of separately manufactured vinyl chloride polymer and vinyl acetate polymer in different ratios. Likewise, the straight vinyl chloride and vinylidene chloride polymers may be employed; and generally resins consisting at least in part of vinyl or vinylidene halide polymers.

(4) The solvent selected should be capable of forming a common solution of the ingredients, and for this purpose different solvent media may be employed for the ingredients insofar as such solvent media will blend or mix together and carry their respective solutes compatibly into the common mixture. Thus, ketones, nitroparaffines, esters, etc., are effective with or without diluents. It has been found that an excellent solvent for the oleo-resinous varnish base and the vinyl resin is comprised of 30 percent of isophorone and 70 percent xylol, for many instances of employment. Isophorone is a commercially-available stable cyclic ketone with a double bond, and is miscible with the usual lacquer solvents and itself is an excellent solvent for various oils, gums and resins; and hence carries both the oleo-resinous varnish base and the selected vinyl resin into the common solution: the xylol is a hydrocarbon solvent for the varnish base and also forms a diluent for the ketone solution of the vinyl resin. For roll coating, other mixtures containing ketone solvents such as methyl isobutyl ketone, mesityl oxide, di-iso-butyl ketone and methyl n-amyl ketone, in combination with coal tar solvents such as xylol, high flash naphtha or hydrogenated naphtha can be employed. For spray coatings, it is presently preferred to dissolve the vinyl resin in a solvent mixture consisting of 45 percent methyl ethyl ketone, 45 percent toluol and 10 percent isophorone, but the aforesaid ketone solvents may be employed in combination with the same or other coal tar solvents such as benzol, hydrogenated naphtha, etc.

The preparation of the composition is accomplished by effecting an interassociation or apparent bonding of the oil and the varnish resin. The ratio of oil to resin in the solids of such a varnish may be varied, say, from 1:4 to 2:1 of oil to varnish resin, and is determined by the brittleness of the particular resin employed and the behavior of the particular oil, to satisfy the demands upon the film with respect to hardness, flexibility, adhesion, chemical resistance, tensile strength, elongation and durability.

*Example I*

In a presently preferred preparation, 100 pounds of an oil-soluble 100 percent phenyl phenol varnish resin of non-heat-hardening type (Bakelite BR–254) is mixed with 100 pounds of China-wood oil and heated in an open varnish kettle to 350 degrees F. in about 20 minutes, and held at that temperature for three hours. It is then thinned with 90 pounds of isophorone and 210 pounds of xylol. The resulting product is an oleo-resinous varnish adapted for compatible mixture with the selected vinyl resin.

80 pounds of co-polymerized vinyl resin consisting of aproximately 87 percent vinyl chloride and 13 percent vinyl acetate (Vinylite VYHH) is dissolved in 96 pounds of isophorone and 224 pounds of xylol (20 percent solids) to give 400 pounds of vinyl resin solution. This is then mixed with 50 pounds of the oleo-resinous varnish prepared as above (40 percent solids) and gives 450 pounds of an oleo-resinous-vinyl resin lacquer (22.2 percent solids). The temperature employed during the final mixing is determined by convenience.

This lacquer is applied to metals in normal ways, and baked to remove the solvent, to cure the oleo-resinous component and to obtain adhesion. The lacquer of this formula may be baked at temperatures between 275 and 375 degrees F., thus having the wide baking range of 100 degrees F. The upper limit of baking range is determined by burning or thermal decomposition of the lacquer film on the particular metal base, and the lower limit by insufficient adhestion and resistance of the lacquer film.

*Example II*

In another preferred preparation, 100 pounds of the same phenyl phenol varnish resin (Bakelite BR–254) is heated to 350 degrees F. together with 50 pounds of China-wood oil in about 20 minutes and held at 350 degrees F. for 2½ hours. It is then thinned with 67½ pounds of isophorone and 157½ pounds of xylol. 50 pounds of this oleo-resinous varnish (40% solids) are then thoroughly mixed with 400 pounds of the vinyl resin solution (20 percent solids) as prepared in Example I to produce 450 pounds of an oleo-resinous-vinyl resin lacquer, which is applied and baked as in Example I.

*Example III*

Another presently preferred lacquer is made by mixing 86 pounds of the oleoresinous varnish (40 percent solids) prepared as in Example I with 400 pounds of vinyl resin solution (20 percent solids) as prepared in Example I to produce 486 pounds of an oleoresinous-vinyl resin lacquer, which is applied and baked as in Example I.

From Examples I, II and III, it will be noted that variations of oil length and content of oleo-resinous varnish base may be employed for determining the quantity of materials present in forming the oleo-resinous stratification.

*Example IV*

A lacquer excellently adapted for receiving a white opaquing pigment is made by heating together to 350 degrees F. in about 20 minutes in an open varnish kettle 100 pounds of an oil-soluble non-heat hardening 100 percent phenolic varnish resin (Super-Beckacite 2000) and 100 pounds of China-wood oil and holding at 350 degrees F. for 3 hours. The varnish is then thinned with 90 pounds of isophorone and 210 pounds of xylol. The resulting product is an oleo-resinous varnish adapted for compatible mixture with the selected vinyl resin. 50 pounds of this oleo-resinous varnish (40 percent solids) are then thoroughly mixed with 400 pounds of the vinyl resin solution (20 percent solids) as prepared in Example I. This produces an oleo-resinous-vinyl resin lacquer which is very pale and colorless in the solvent-free film, both before and after baking, and is especially adapted to the manufacture of pigmented white lacquers.

A white lacquer is made, for example, by grinding on a stone mill or 3-roll paint mill, 43 pounds of pure titanium dioxide with 50 pounds of the oleo-resinous varnish as prepared above to effect pigment dispersion. This 93 pounds of white oleo-resinous pigment paste is then mixed with 400 pounds of the vinyl resin solution as used above to produce a white oleo-resinous-vinyl resin lacquer which may be applied and baked as mentioned in Example I. The best color results from using baking temperatures around 275 to 300 degrees F.

A white lacquer may also be made, of even greater opacity and better color by dispersing titanium dioxide in the vinyl resin solution by a grinding operation as above to break up the pigment and assure a condition of satisfaction of the electric charges, and then mixing with the oleo-resinous varnish to make a white oleo-resinous-vinyl resin lacquer. For example, the 43 pounds of titanium dioxide are mixed with 80 pounds of the vinyl resin used in Example I (Vinylite VYHH) and 20 pounds of isophorone and milled on a rubber mill to effect complete pigment dispersion. This material is then dissolved in 76 pounds of isophorone and 224 pounds of xylol to make a white vinyl resin lacquer to which is added 50 pounds of the oleo-resinous varnish as prepared above to make a white oleo-resinous-vinyl resin lacquer, which in some respects (such as gloss, color, and baking range) is superior to the above lacquer prepared by dispersing the pigment in the oleo-resinous varnish; and which is also superior to lacquers prepared by grinding pigment directly with plasticized vinyl resin as the isophorone can be eliminated during the baking operation.

The above examples describe white lacquers, which are usually difficult to produce: obviously, other pigments and coloring matters may be employed or introduced for obtaining a desired color.

Example V

Although China-wood oil is preferred because of its drying speed, other oils can be used in making the oleo-resinous varnish. For example, 100 pounds of the same phenyl phenol varnish resin (Bakelite BR–254) as used in Example I is heated to 350 degrees F. together with 100 pounds of a selected dehydrated castor oil (Isoline) and held at 350 degrees F. for 3 hours. It is then thinned with 90 pounds of isophorone and 210 pounds of xylol. The resulting product is an oleo-resinous varnish adapted for compatible mixture with the selected vinyl resin. 50 pounds of this oleo-resinous varnish (40 percent solids) is then mixed with 400 pounds of vinyl resin solution prepared as in Example I, and gives 450 pounds of an oleo-resinous-vinyl resin lacquer (22.2 percent solids). The temperature employed during the final mixing is determined by convenience. The lacquer can be employed as in Example I.

Example VI

Other resins may be used also with dehydrated castor oil in making the oleo-resinous varnish. As an example of a varnish resin of group (C) above, 100 pounds of an esterified copal (No. 500 Kopol) are placed in an open varnish kettle together with 100 pounds of a selected dehydrated castor oil (Dehydrol) and heated to 350 degrees F. in about 20 minutes. The varnish is held at 350 degrees F. for 1 hour, then the temperature is raised rapidly in about 15 minutes to 540 degrees F. in order to effect perfect solubility of the No. 500 Kopol in this oil. The varnish is then cooled to 350 degrees F. in about 15 minutes and held at 350 degrees F. for 1 hour longer. It is then thinned with 90 pounds of isophorone and 210 pounds of xylol. The resulting product is an oleo-resinous varnish adapted for compatible mixture with the selected vinyl resin. 50 pounds of this oleo-resinous varnish (40 percent solids) is then mixed with 400 pounds of vinyl resin solution prepared as in Example I, and gives 450 pounds of an oleo-resinous-vinyl resin lacquer (22.2 percent solids). The temperature employed during the final mixing is determined by convenience. The lacquer can be employed as in Example I.

Example VII

As an example employing a varnish resin of group (E) above, 100 pounds of an oil-soluble resinous reaction product of monomeric styrene and an oil-soluble phenol-aldehyde varnish resin (Bakelite XRS–1) are placed in an open varnish kettle together with 100 pounds of China-wood oil and heated to 350 degrees F. in about 20 minutes and held at that temperature for 2½ hours. The varnish is then thinned with 90 pounds of isophorone and 210 pounds of xylol. The resulting product is an oleo-resinous varnish adapted for compatible mixture with the selected vinyl resin. 50 pounds of this oleo-resinous varnish (40 percent solids) is then mixed with 400 pounds of vinyl resin solution prepared as in Example I, and gives 450 pounds of an oleo-resinous vinyl resin lacquer (22.2 percent solids). The temperature employed during the final mixing is determined by convenience. The lacquer can be employed as in Example I.

Example VIII

Slower drying oils may be used in making the oleo-resinous varnish, although somewhat shorter oil lengths and strong resins should then be used. For example, 80 pounds of a refined soya bean oil and 100 pounds of an oil and heat reactive phenolic varnish resin (Bakelite XR–3360) are heated together in an open varnish kettle to 350 degrees F. in about 1 hour. It is then thinned with 81 pounds of isophorone and 189 pounds of xylol. The resulting product is an oleoresinous varnish adapted for compatible mixture with the selected vinyl resin. 50 pounds of this oleo-resinous varnish prepared as above (40 percent solids) is then mixed with 400 pounds of vinyl resin solution prepared as in Example I, and gives 450 pounds of an oleo-resinous-vinyl resin lacquer (22.2 percent solids). The temperature employed during the final mixing is determined by convenience. This lacquer can be employed as in Example I.

This oleo-resinous-vinyl resin lacquer does not have as good adhesion and moisture resistance as the lacquer prepared in Example I, due to the slower drying characteristics of the oleo-resinous varnish prepared from the slower drying soya bean oil, but can be employed for purposes where rapid drying is not a prerequisite and where continuous exposure of the coating to moisture is not expected, as in external coatings on containers, art metal, etc.

Example IX

The use of semi-drying oils in the oleo-resinous varnish results in lacquers with less moisture and chemical resistance than that of the preferred examples shown above. However, such oils can be used to make lacquers valuable for some purposes other than for protective films for metal: and as with Example VIII, shorter oil lengths and strong resins and longer times of baking should be used therewith. For example, 50 pounds of a refined rapeseed oil and 100 pounds of the resin used in Example VIII (Bakelite XR–3360) are heated together in an open varnish kettle to 300 degrees F. in about 20 minutes and held at 300 degrees F. for 45 minutes. The varnish is then thinned with 67½ pounds of isophorone and 157½ pounds of xylol. The resulting product is an oleoresinous varnish adapted for compatible mixture with the selected vinyl resin. 50 pounds of this oleo-resinous varnish prepared as above (40 percent solids) is then mixed with 400 pounds of vinyl resin solution prepared as in Example I, and gives 450 pounds of an oleo-resinous vinyl resin lacquer (22.2 percent solids). The temperature employed during the final mixing is determined by convenience. This lacquer can be employed as in Example I.

This oleoresinous-vinyl resin lacquer does not have as valuable properties as the preferred lacquers such as those prepared in Examples I, II, III and IV, due to the use of the slower drying rapeseed oil which produces a slower drying, less resistant, oleo-resinous varnish.

*Example X*

Other vinyl resins may be used in making the lacquer, although they are not generally as satisfactory as the vinyl resin referred to in previous examples, due to their high viscosity in solution with consequent low solids content of the lacquer when thinned to a desirable working condition. For example, 100 pounds of the resin unsed in Example I (Bakelite BR-254) and 100 pounds of refined perilla oil are heated together in an open varnish kettle to 350 degrees F. in about 20 minutes. The varnish is held at 350 degrees F. for 3 hours. It is then thinned with 90 pounds of isophorone and 210 pounds of xylol. The resulting product is an oleo-resinous varnish adapted for compatible mixture with the selected vinyl resin. 20 pounds of polymerized vinyl chloride (Vinylite QYNA) are dissolved in 114 pounds of isophorone and 266 pounds of xylol (5% solids). This is then mixed with 12½ pounds of the oleo-resinous varnish prepared as above (40% solids) to produce an oleo-resinous-vinyl resin lacquer.

This oleo-resinous-vinyl resin lacquer has low solids content due to the poor solubility and high viscosity of the vinyl-resin used and is, therefor, not as valuable for general purposes as the preferred lacquers, such as those prepared in Examples I, II, III and IV. It can be employed in cases where it is desired to have a relatively viscous lacquer and to leave thin coatings on the articles.

*Example XI*

Although the copolymer resins are preferred, physical mixtures of polymerized vinyl halides and polymerized vinyl esters can be used as the vinyl resin in the lacquer. For example, 15 pounds of polymerized vinyl chloride (Vinylite QYNA) and 5 pounds of polymerized vinyl acetate (Vinylite AYAA) are dissolved in 114 pounds of isophorone and 266 pounds of xylol (5 percent solids). This is then mixed with 12½ pounds of the oleo-resinous varnish prepared as in Example I (40 percent solids) to produce an oleo-resinous-vinyl resin lacquer.

This oleo-resinous-vinyl resin lacquer has low solids content due to the use of the relatively insoluble vinyl chloride polymer (Vinylite QYNA).

*Example XII*

Colored lacquers can be made with any of the above compositions. A transparent gold lacquer is made, for example, by dissolving ½ pound of Resinoil Brown Y die in 450 pounds of the lacquer as prepared in Example I.

*Example XIII*

Colored lacquers of pigmented type, with exceptional fastness to heat and light, can be prepared by grinding transparent lake colors in any of the oleo-resinous varnishes prepared as in the above examples. For example, 9 pounds of a yellow lake (Imperial A-4319) and 1 pound of a red lake (Imperial A-4333) are ground on a stone mill or 3-roller paint mill with 50 pounds of the oleo-resinous varnish as prepared in Example I. This gold oleo-resinous pigment paste is then mixed with 400 pounds of the vinyl resin solution as prepared in Example I to produce a transparent gold oleo-resinous-vinyl resin lacquer.

*Example XIV*

Aluminum pigmented lacquers can be made with any of the above lacquers. For example, 4 avoirdupois ounces of aluminum powder (Alcoa No. 422) are added to each gallon of the lacquer as prepared in Example I to produce an aluminum oleo-resinous-vinyl resin lacquer.

*Example XV*

While the compositions of the above examples were thinned with solvents excellently adapted for roller coating, they can also be thinned with solvents adapted for spraying. For example, the oleo-resinous varnish as prepared in Example I is thinned with 300 pounds of toluol. The resulting product is an oleo-resinous varnish (40 percent solids) adapted for compatible mixture with the selected vinyl resin.

80 pounds of a copolymerized vinyl resin consisting of 85 percent vinyl chloride and 15 percent vinyl acetate (Vinylite VYHH) are dissolved in 220 pounds of methyl ethyl ketone, 190 pounds of toluol and 49 pounds of isophorone (14.9 percent solids). 50 pounds of the oleo-resinous varnish prepared as above are then stirred into this vinyl resin solution and mixed thoroughly to produce 589 pounds of an oleo-resinous-vinyl resin lacquer (17 percent solids) adapted for spraying.

*Example XVI*

Another preparation presently preferred is made by mixing together 100 pounds of a modified phenolic resin (Beckacite 1100) and 100 pounds of China-wood oil and heating in an open varnish kettle to 350 degrees F. in about 20 minutes. The varnish is held at 350 F. for 3 hours. It is then thinned with 90 pounds of isophorone and 210 pounds of xylol. The resulting product is an oleo-resinous varnish adapted for compatible mixture with the selected vinyl resin. 50 pounds of this oleo-resinous varnish (40 percent solids) is then mixed with 400 pounds of vinyl resin solution prepared as in Example I, and gives 450 pounds of an oleo-resinous-vinyl lacquer (22.2 percent solids). The temperature employed during the final mixing is determined by convenience.

A gold colored-aluminum pigmented oleo-resinous vinyl resin lacquer excellently adapted to application on steel sheets can be made by adding 2 avoirdupois ounces of aluminum powder (Alcoa No. 422) and 1 avoirdupois ounce of a brown dye (Resinoil Brown Y) to each gallon of the above oleo-resinous-vinyl resin lacquer.

*Example XVII*

Another preparation is made by mixing together 100 pounds of a coumarone-indene resin (Hard Nevillac) and 100 pounds of China-wood oil and heating together in an open varnish kettle to 350 degrees F. in about 20 minutes. The varnish is held at 350 degrees F. for 3 hours. It is then thinned with 90 pounds of isophorone and 210 pounds of xylol. The resulting product is an oleoresinous varnish adapted for compatible mixture with the selected vinyl resin. 50 pounds of this oleo-resinous varnish prepared as above (40 percent solids) is then mixed with 400 pounds of vinyl resin solution prepared as in Example I, and gives 450 pounds of an oleo-resinous-vinyl lacquer (22.2 percent solids). The temperature employed during the final mixing is determined by convenience.

While the above examples have been set out to indicate specific forms of practice, it should be understood that two or more resins can be employed simultaneously and cooked with one or more oils, and that it is likewise feasible to employ a mixture of drying oils in cooking one or more resins. Further, it is feasible to prepare separate oleo-resinous varnishes containing one or more drying oils and one or more varnish resins, and then to blend these prior to or after the completion of the cooking of each of the individual oleo-resinous varnish components. These operations can be employed for carrying into the oleo-resinous varnish, and thus into the final lacquer, desirable and distinctive qualities of the several varnish resins or drying oils as selected.

Likewise, the blending or mixing of the oleoresinous base and the vinyl resin for producing the common solution may be accomplished in various ways according to the materials employed and the economics of the operation. It is normally more advantageous to add the solvent to the hot oleo-resinous base and thereby effect both a dilution and a cooling, and then to introduce the vinyl resin solution. However, it is feasible to proceed in other manners, as by bringing the oleo-resinous base and the vinyl resin into a common solvent, either together or successively.

The desired properties of compatibility are not obtainable by simple solution of a resin in the oil, nor by the use of a normal common solvent. Hence, the purpose of the cooking is to attain a maximum interassociation of the oil and varnish resin, while restricting so far as practicable a polymerization of the oil. At relatively low cooking temperatures, the interassociation of oil and varnish resin progresses more rapidly than polymerization of the oil; while at the cooking temperatures normally employed for making oleoresinous coating varnishes, the polymerization of the oil is greatly accelerated as compared with the interassociation. The temperature employed in cooking the oil and varnish resin together is, therefore, maintained comparatively low relative to that employed in commercial production of varnishes from the same ingredients, as a high temperature cooking does not lead to the production of oleo-resinous varnishes which are compatible with vinyl resin. The duration of the cooking is longer than in commercial practice for forming such varnishes, and must be sufficient to assure the interassociation of the oil and varnish resin so that the varnish base will be compatible with the selected vinyl resin, and must not be so long as to result in such a degree of polymerization that the product is no longer compatible with the vinyl resin solution. With these restrictions, satisfactory oleo-resinous varnishes may be made by use of various oils and varnish resins. The China-wood oil and varnish resin of Example I, for instance, may be combined at a temperature of 300 degrees F. by continuing the cooking for six hours. In no instance, however, should either the temperature or the duration of the treatment be such that the mixture of varnish solution and vinyl resin solution tends to develop non-dispersible gel spots. The polymerization and curing of the oil-resin complex is continued and completed in the baking, and effects a solidification of the coating with fixation of its characteristics. An essential difference between the present procedure and prior endeavors to employ vinyl resin coatings is the present employment in the vinyl resin composition of an oleo-resinous varnish component which receives its major polymerization by a baking operation.

Heat-bodied and blown oils are compatible with vinyl resin solutions to very limited extents, and the product does not have the properties of the lacquer coatings set out above. For example, blown oils are limited to a compatibility of 10 percent with vinyl resins, and at such percentages the film is too soft for the demands upon it.

The oleo-resinous varnish may be blended either hot or cold with the selected vinyl resin solution to form the coating lacquer. The relative proportions comprise from 5 to 50 percent of oleo-resinous varnish solids in the total solids of the blended lacquer. It is presently preferred to employ about 20 percent of oleo-resinous varnish solids and 80 percent of vinyl resin solids.

A drier, such as lead, cobalt, or manganese, resinate or naphthenate, etc., may be introduced into the oleo-resin varnish or into the lacquer immediately before the coating operation, to exercise its effect during the baking. One-twentieth percent of cobalt as cobalt naphthenate may, for example, be added to an oleo-resinous varnish calculated on the quantity of oil, to accelerate the curing of the oleo-resinous component.

The lacquer coating has excellent adhesion to metals and does not cleave or peel (as often happens in two-coat systems), and permits, for example, the drawing of cone top beer can ends from the sheets coated with enamel in the flat, with a retained lacquer adhesion and continuity of the vinyl resin surfacing even on the extremely fabricated units, after pasteurization at 140 to 180 degrees F. and even as high as 212 to 230 degrees F. with some compositions: and no water blush is developed at pasteurizing temperatures of 180 to 212 degrees F. whereas blushing does occur with vinyl resins alone or when vinyl resins are modified simply by the alkyd types of resins. The excellent flexibility and drawing characteristics, with the tight adhesion, permit the drawing of the lacquered sheets without stripping or cleavage and with very little or no metal exposure even on deeply drawn units: and these characteristics are preserved even in instances where the underlying oleo-resinous varnish layer is crazed or broken, as the adhesion remains and the tough vinyl resin surfacing provides a continuous impermeable film.

The preferred coatings do not impart off-flavor or odors to beer or other foodstuffs; and hence the coatings are excellently adapted for cans and other containers for foods, beer, etc., for bottle cap liners and screw caps and other closures, and for the foils employed for wrapping cheese, candy, etc.

The composition can be employed for coating various materials, and is particularly advantageous upon metal for the reasons above stated. Hence, it may be employed for coating metals where resistance to atmospheric influences is requisite, and in cases where the coated material is to be contacted by acids, alkalies, oxidizing agents, oils and fats, alcohols, soap and other detergents, petroleum hydrocarbon solvents, etc. Hence, it can be employed on the external and internal surfaces of cans, on closure caps, on so-called overall or spot liners for closure caps and stoppers, and on foils of tin, aluminum, zinc and lead, and as a protective coating over lithography, etc. Since it accepts pigments and coloring matter easily, it forms an advantageous vehicle for lithograph inks and coatings, and permits the decoration and protecting of surfaces of sheet metal by single printing and coatings operations which are accomplished in the desired colors for prescribed areas of a sheet.

It is likewise useful as a protective coating for metal, as it does not permit the passing of hydrogen sulfide, sulfur dioxide and like gases which otherwise might stain or corrode the underlying metal surface; and hence is useful for automobile bodies, electrical fixtures, and the like.

Though the polarization effects are not revealed during the use of the coating upon paper or other non-polar absorptive material, it has been found that the differentiation in molecule size between the oleo-resinous varnish molecules and the vinyl resin molecules leads to a segregation by the permitted infiltration of the smaller molecules of oleo-resinous matter into the paper, so that an excellent adhesion is thereby attained, while the external surface is provided by vinyl resin through the differential concentration or stratification so that the resistant properties of a predominant vinyl resin coating are present.

It will be understood that the invention is not limited to the specific examples given, but may be modified in many ways within the scope of the appended claims.

What is claimed:

1. The process of preparing a coating composition containing an oleoresinous varnish base and a vinyl resin, which comprises heating a drying oil having dissolved therein an oil-soluble varnish resin selected from the group consisting of phenol-aldehyde resins, natural resins, ester gum, glycerol esterified copals, masticated copals, fused copals, phenolated copals, hydrogenated rosin, coumarone and indene resins, hydrogenated coumarone and indene resins, resinous reaction products of monomeric styrene and an oil-soluble phenol-aldehyde resin, oil-soluble hydrocarbon resins obtained by polymerization of olefin-diolefin fractions of cracked petroleum distillates, and oil-soluble dihydronaphthalene polymer resins in proportions of oil:varnish resin of essentially 1:4 to 2:1 for substantially 1 to 6 hours at a temperature of substantially 300 to 350 degrees F.; the selected varnish resin and the selected vinyl resin being compatible with one another; said heating being effective to produce an interassociation of the oil and varnish resin for providing the oleoresinous varnish base; said heating being terminated while the oleoresinous varnish base is still compatible with the selected vinyl resin, while the oleoresinous varnish base is free from the tendency to develop non-dispersible gel spots while in common solution with the selected vinyl resin, and prior to extensive polymerization of the oleoresinous base; and mixing this oleoresinous varnish base into a common solution in a volatile organic solvent with a polymerized vinyl resin selected from the group consisting of copolymers and mixed polymers derived from a vinyl halide and vinyl acetate.

2. The process of preparing a coating composition containing an oleoresinous varnish base and a vinyl resin, which comprises heating a drying oil having dissolved therein an oil-soluble varnish resin selected from the group consisting of phenol-aldehyde resins, natural resins, ester gum, glycerol esterified copals, masticated copals, fused copals, phenolated copals, hydrogenated rosin, coumarone and indene resins, hydrogenated coumarone and indene resins, resinous reaction products of monomeric styrene and an oil-soluble phenol-aldehyde resin, oil-soluble hydrocarbon resins obtained by polymerization of olefin-diolefin fractions of cracked petroleum distillated, and oil-soluble dihydro-naphthalene polymer resins in proportions of oil:varnish resin of essentially 1:4 to 2:1 for substantially 1 to 6 hours at a temperature of substantially 300 to 350 degrees F.; the selected varnish resin and the selected vinyl resin being compatible with one another; said heating being effective to produce an interassociation of the oil and varnish resin for providing the oleoresinous varnish base; said heating being terminated while the oleoresinous varnish base is still compatible with the selected vinyl resin, while the oleoresinous varnish base is free from the tendency to develop non-dispersible gel spots while in common solution with the selected vinyl resin, and prior to extensive polymerization of the oleoresinous base; and mixing this oleoresinous varnish base into a common solution in a volatile organic solvent with a copolymerized vinyl resin derived in major part from vinyl chloride and in minor part from vinyl acetate.

3. The process of preparing a coating composition containing an oleoresinous varnish base and a vinyl resin, which comprises heating a drying oil having at least two conjugated double bonds in an acid radical and having dissolved therein an oil-soluble phenol-aldehyde varnish resin in proportions of oil:varnish resin of essentially 1:4 to 2:1 for substantially 1 to 6 hours at a temperature of substantially 300 to 350 degrees F.; the selected varnish resin and the selected vinyl resin being compatible with one another; said heating being effective to produce an interassociation of the oil and varnish resin for providing the oleoresinous varnish base; said heating being terminated while the oleoresinous varnish base is still compatible with the selected vinyl resin, while the oleoresinous varnish base is free from the tendency to develop non-dispersible gel spots while in common solution with the selected vinyl resin, and prior to extensive polymerization of the oleoresinous base; and mixing this oleoresinous varnish base into a common solution in a volatile organic solvent with a copolymerized vinyl resin derived from a vinyl halide and vinyl acetate.

4. The process of preparing a coating composition containing an oleoresinous varnish base and a vinyl resin, which comprises heating a drying oil having at least two conjugated double bonds in an acid radical and having dissolved therein an oil-soluble resinous reaction product of monomeric styrene and an oil-soluble phenol-aldehyde resin in proportions of oil:varnish resin of essentially 1:4 to 2:1 for substantially 1 to 6 hours at a temperature of substantially 300 to 350 degrees F.; the selected varnish resin and the selected vinyl resin being compatible with one another; said heating being effective to produce an interassociation of the oil and varnish resin for providing the oleoresinous varnish base; said heating being terminated while the oleoresinous varnish base is still compatible with the selected vinyl resin, while the oleoresinous varnish base is free from the tendency to develop non-dispersible gel spots while in common solution with the selected vinyl resin, and prior to extensive polymerization of the oleoresinous base; and mixing this oleoresinous varnish base into a common solution in a volatile organic solvent with a copolymerized vinyl resin derived from a vinyl halide and vinyl acetate.

5. The process of preparing a coating composition containing an oleoresinous varnish base and a vinyl resin, which comprises heating a drying oil having at least two conjugated double bonds in an acid radical and having dissolved therein an oil-soluble hydrocarbon resin obtained by polymerization of olefin-diolefin fractions of cracked petroleum distillates in proportions of oil:varnish resin of essentially 1:4 to 2:1 for substantially 1 to 6 hours at a temperature of substantially 300 to 350 degrees F.; the selected varnish resin and the selected vinyl resin being compatible with one another; said heating being effective to produce an interassociation of the oil and varnish resin for providing the oleoresinous varnish base; said heating being terminated while the oleoresinous varnish base is still compatible with the selected vinyl resin, while the oleoresinous varnish base is free from the tendency to develop non-dispersible gel spots while in common solution with the selected vinyl resin, and prior to extensive polymerization of the oleoresinous base; and mixing this oleoresinous varnish base into a common solution in a volatile organic solvent with a copolymerized vinyl resin derived from a vinyl halide and vinyl acetate.

6. The process of preparing a coating composition containing an oleoresinous varnish base and a vinyl resin, which comprises heating a drying oil having dissolved therein an oil-soluble non-heat-hardening phenylphenol-aldehyde in proportions of oil:varnish resin of essentially 1:4 to 2:1 for substantially 1 to 6 hours at a temperature of substantially 300 to 350 degrees F.; the selected varnish resin and the selected vinyl resin being compatible with one another; said heating being effective to produce an interassociation of the oil and varnish resin for providing the oleoresinous varnish base; said heating being terminated while the oleoresinous varnish base is still compatible with the selected vinyl resin, while the oleoresinous varnish base is free from the tendency to develop non-dispersible gel spots while in common solution with the selected vinyl resin, and prior to extensive polymerization of the oleoresinous base; and mixing this oleoresinous varnish base into a common solution in a volatile organic solvent with a copolymerized vinyl resin derived from a vinyl halide and vinyl acetate.

7. The process of preparing a coating composition containing an oleoresinous varnish base and a vinyl resin, which comprises heating a drying oil having dissolved therein an oil-soluble resinous reaction product of monomeric styrene and an oil-soluble phenol-aldehyde resin in proportions of oil:varnish resin of essentially 1:4 to 2:1 for substantially 1 to 6 hours at a temperature of substantially 300 to 350 degrees F.; the selected varnish resin and the selected vinyl resin being compatible with one another; said heating being effective to produce an interassociation of the oil and varnish resin for providing the oleoresinous varnish base; said heating being terminated while the oleoresinous varnish base is still compatible with the selected vinyl resin, while the oleoresinous varnish base is free from the tendency to develop non-dispersible gel spots while in common solution with the selected vinyl resin, and prior to extension polymerization of the oleoresinous base; and mixing this oleoresinous varnish base into a common solution in a volatile organic solvent with a copolymerized vinyl resin derived from a vinyl halide and vinyl acetate.

8. The process of preparing a coating composition containing an oleoresinous varnish base and a vinyl resin, which comprises heating a drying oil having at least two conjugated double bonds in an acid radical and having dissolved therein an oil-soluble non-heat-hardening phenylphenol-aldehyde resin in proportions of oil:varnish resin of essentially 1:4 to 2:1 for substantially 1 to 3 hours at a temperature of substantially 350 degrees F.; the selected varnish resin and the selected vinyl resin being compatible with one another; said heating being effective to produce an interassociation of the oil and varnish resin for providing the oleoresinous varnish base; said heating being terminated while the oleoresinous varnish base is still compatible with the selected vinyl resin, while the oleoresinous varnish base is free from the tendency to develop non-dispersible gel spots while in common solution with the selected vinyl resin, and prior to extensive polymerization of the oleoresinous base; and mixing this oleoresinous varnish base into a common solution in a volatile organic solvent with a copolymerized vinyl resin derived from a vinyl halide and vinyl acetate.

9. The process of preparing a coating composition containing an oleoresinous varnish base and a vinyl resin, which comprises heating a drying oil having at least two conjugated double bonds in an acid radical and having dissolved therein an oil-soluble resinous reaction product of monomeric styrene and an oil-soluble phenol-aldehyde resin in proportions of oil:varnish resin of essentially 1:4 to 2:1 for substantially 1 to 3 hours at a temperature of substantially 350 degrees F.; the selected varnish resin and the selected vinyl resin being compatible with one another; said heating being effective to produce an interassociation of the oil and varnish resin for providing the oleoresinous varnish base; said heating being terminated while the oleoresinous varnish base is still compatible with the selected vinyl resin, while the oleoresinous varnish base is free from the tendency to develop non-dispersible gel spots while in common solution with the selected vinyl resin, and prior to extensive polymerization of the oleoresinous base; and mixing this oleoresinous varnish base into a common solution in a volatile organic solvent with a copolymerized vinyl resin derived from a vinyl halide and vinyl acetate.

10. The process of preparing a coating composition containing an oleoresinous varnish base and a vinyl resin, which comprises heating a drying oil having at least two conjugated double bonds in an acid radical and having dissolved therein an oil-soluble hydrocarbon resin obtained by polymerization of olefin-diolefin fractions of cracked petroleum distillates in proportions of oil:varnish resin of essentially 1:4 to 2:1 for substantially 1 to 3 hours at a temperature of substantially 350 degrees F.; the selected varnish resin and the selected vinyl resin being compatible with one another; said heating being effective to produce an interassociation of the oil and varnish resin for providing an oleoresinous varnish base; said heating being terminated while the oleoresinous varnish base is still compatible with the selected vinyl resin, while the oleoresinous varnish base is free from the tendency to develop non-dispersible gel spots while in common solution with the selected vinyl resin, and prior to extensive polymerization of the oleoresinous base; and mixing this oleoresinous varnish base into a common solution in a volatile organic solvent with a copolymerized vinyl resin derived from a vinyl halide and vinyl acetate.

11. The process of preparing a coating composition containing an oleoresinous varnish base and a vinyl resin, which comprises heating a drying oil having at least two conjugated double bonds in an acid radical and having dissolved therein an oil-soluble non-heat-hardening phenylphenol-aldehyde resin in proportions of oil:varnish resin of essentially 1:4 to 2:1 for substantially 1 to 3 hours at a temperature of substantially 350 degrees F.; the selected varnish resin and the selected vinyl resin being compatible with one another; said heating being effective to produce an interassociation of the oil and varnish resin for providing the oleoresinous varnish base; said heating being terminated while the oleoresinous varnish base is still compatible with the selected vinyl resin, while the oleoresinous varnish base is free from the tendency to develop non-dispersible gel spots while in common solution with the selected vinyl resin, and prior to extensive polymerization of the oleoresinous base; and mixing this oleoresinous varnish base into a common solution in a volatile organic solvent with a copolymerized vinyl resin derived in major part from vinyl chloride and in minor part from vinyl acetate.

12. The process of preparing a coating composition containing an oleoresinous varnish base and a vinyl resin, which comprises heating a drying oil having at least two conjugated double bonds in an acid radical and having dissolved therein an oil-soluble resinous reaction product of monomeric styrene and an oil-soluble phenol-aldehyde resin in proportions of oil:varnish resin of essentially 1:4 to 2:1 for substantially 1 to 3 hours at a temperature of substantially 350 degrees F.; the selected varnish resin and the selected vinyl resin being compatible with one another; said heating being effective to produce an interassociation of the oil and varnish resin for providing the oleoresinous varnish base; said heating being terminated while the oleoresinous varnish base is still compatible with the selected vinyl resin, while the oleoresinous varnish base is free from the tendency to develop non-dispersible gel spots while in common solution with the selected vinyl resin, and prior to extensive polymerization of the oleoresinous base; and mixing this oleoresinous varnish base into a common solution in a volatile organic solvent with a copolymerized vinyl resin derived in major part from vinyl chloride and in minor part from vinyl acetate.

13. The process of preparing a coating composition containing an oleoresinous varnish base and a vinyl resin, which comprises heating a drying oil having at least two conjugated double bonds in an acid radical and having dissolved therein an oil-soluble hydrocarbon resin obtained by polymerization of olefin-diolefin fractions of cracked petroleum distillates in proportions of oil:varnish resin of essentially 1:4 to 2:1 for substantially 1 to 3 hours at a temperature of substantially 350 degrees F.; the selected varnish resin and the selected vinyl resin being compatible with one another; said heating being effective to produce an interassociation of the oil and varnish resin for providing the oleoresinous varnish base; said heating being terminated while the oleoresinous varnish base is still compatible with the selected vinyl resin, while the oleoresinous varnish base is free from the tendency to develop non-dispersible gel spots while in common solution with the selected vinyl resin, and prior to extensive polymerization of the oleoresinous base; and mixing this oleoresinous varnish base into a common solution in a volatile organic solvent with a copolymerized vinyl resin derived in major part from vinyl chloride and in minor part from vinyl acetate.

14. The process of preparing a coating composition containing an oleoresinous varnish base and a vinyl resin, which comprises heating China-wood oil having dissolved therein an oil-soluble non-heat-hardening phenylphenol-aldehyde resin in proportions of oil:varnish of essentially 1:1 for substantially 3 hours at a temperature of substantially 350 degrees F.; the selected varnish resin and the selected vinyl resin being compatible with one another; said heating being effective to produce an interassociation of the oil and varnish resin for providing the oleoresinous varnish base; said heating being terminated while the oleoresinous varnish base is still compatible with the selected vinyl resin, while the oleoresinous varnish base is free from the tendency to develop non-dispersible gel spots while in common solution with the selected vinyl resin, and prior to extensive polymerization of the oleoresinous base; thinning 100 parts of this oleoresinous varnish base with a mixture of 105 parts xylol and 45 parts isophorone, then mixing together 50 parts of this thinned oleoresinous varnish base and 400 parts of a solution of 80 parts of a copolymerized vinyl resin consisting of approximately 87 percent vinyl chloride and 13 percent vinyl acetate in a mixture of 224 parts xylol and 96 parts isophorone.

15. The process of preparing a coating composition containing an oleoresinous varnish base and a vinyl resin, which comprises heating China-wood oil having dissolved therein an oil-soluble resinous reaction product of monomeric styrene and an oil-soluble phenol-aldehyde resin in proportions of oil:varnish resin of essentially 1:1 for substantially 2½ hours at a temperature of substantially 350 degrees F.; the selected varnish resin and the selected vinyl resin being compatible with one another; said heating being effective to produce an interassociation of the oil and varnish resin for providing the oleoresinous varnish base; said heating being terminated while the oleoresinous varnish base is still compatible with the selected vinyl resin, the oleoresinous varnish base is free from the tendency to develop nondispersible gel spots while in common solution with the selected vinyl resin, and prior to extensive polymerization of the oleoresinous base; thinning 100 parts of this oleoresinous varnish base with a mixture of 105 parts xylol and 45 parts isophorone, then mixing together 50 parts of this thinned oleoresinous varnish base and 400 parts of a solution of 80 parts of a copolymerized vinyl resin consisting of approximately 87 percent vinyl chloride and 13 percent vinyl acetate in a mixture of 224 parts xylol and 96 parts isophorone.

16. The process of preparing a colored coating composition containing an oleoresinous varnish base and a vinyl resin, which comprises heating a drying oil and having dissolved therein an oil-soluble varnish resin selected from the group consisting of phenol-aldehyde resins, natural resins, ester gum, glycerol esterified copals, masticated copals, fused copals, phenolated copals, hydrogenated rosin, coumarone and indene resins, hydrogenated coumarone and indene resins, resinous reaction products of monomeric styrene and an oil-soluble phenol-aldehyde resin, oil-soluble hydrocarbon resins obtained by polymerization of olefin-diolefin fractions of cracked petroleum distillates, and oil-soluble dihydronaphthalene polymer resins in proportions of oil:varnish resin of essentially 1:4 to 2:1 for substantially 1 to 6 hours at a temperature of substantially 300 to 350 degrees F.; the selected varnish resin and the selected vinyl resin being compatible with one another; said heating being effective to produce an interassociation of the oil and varnish resin for providing the oleoresinous varnish base; said heating being terminated while the oleoresinous varnish base is still compatible with the selected vinyl resin, while the oleoresinous varnish base is free from the tendency to develop non-dispersible gel spots while in common solution with the selected vinyl resin, and prior to extensive polymerization of the oleoresinous base; and mixing this oleoresinous varnish base into a common solution in a volatile organic solvent with a polymerized vinyl resin selected from the group consisting of copolymers and mixed polymers derived from a vinyl halide and vinyl acetate, a coloring matter having been distributed in the oleoresinous component prior to the mixing of the oleoresinous component into the common solution with the vinyl resin.

17. A coating composition comprising an oleoresinous varnish base, a polymerized vinyl resin, and a volatile organic solvent medium for said oleoresinous base and vinyl resin; said oleoresinous base being a heat-polymerizable product, compatible with the selected vinyl resin and formed by the interassociation of a drying oil and an oil-soluble varnish resin selected from the group consisting of phenol-aldehyde resins, natural resins, ester gum, glycerol-esterified copals, masticated copals, fused copals, phenolated copals, hydrogenated rosin, coumarone and indene resins, hydrogenated coumarone and indene resins, resinous reaction products of monomeric styrene and an oil-soluble phenol-aldehyde resin, oil-soluble hydrocarbon resins obtained by polymerization of olefin-diolefin fractions of cracked pertoleum distillates, and oil-soluble dihydronaphthalene polymer resins through heating a solution of the oil-soluble resin in the drying oil at a temperature of substantially 300 to 350 degrees F. for substantially 1 to 6 hours; said drying oil and varnish resin being present in a proportion of essentially 1:4 to 2:1; the selected varnish resin and vinyl resin being compatible with one another, said heating having been terminated while the oleresinous varnish base is still compatible with the selected vinyl resin and while the oleoresinous varnish base is free from the tendency to develop non-dispersible gel spots while in common solution with the selected vinyl resin and prior to extensive polymerization of the oleoresinous base; said vinyl resin being selected from the group consisting of the copolymers and mixed polymers derived from a vinyl halide and vinyl acetate; and said oleoresinous base constituting from 5 to 50 percent of the total weight of the oleoresinous base and vinyl resin.

18. A coating composition comprising an oleoresinous varnish base, a polymerized vinyl resin, and a volatile organic solvent medium for said oleoresinous base and vinyl resin; said oleoresinous base being a heat-polymerizable product, compatible with the selected vinyl resin and formed by the interassociation of a drying oil and an oil-soluble varnish resin selected from the group consisting of phenol-aldehyde resin, natural resins, ester gum, glycerol-esterified copals, masticated copals, fused copals, phenolated copals, hydrogenated rosin, coumarone and indene resins, hydrogenated coumarone and indene resins, resinous reaction products of monomeric styrene and an oil-soluble phenol-aldehyde resin, oil-soluble hydrocarbon resins obtained by polymerization of olefin-diolefin fractions of cracked petroleum distillates, and oil-soluble dihydronaphthalene polymer resins through heating a solution of the oil-soluble resin in the drying oil at a temperature of substantially 300 to 350 degrees F. for substantially 1 to 6 hours; said drying oil and varnish resin being present in a proportion of essentially 1:4 to 2:1; the selected varnish resin and vinyl resin being compatible with one another, said heating having been terminated while the oleoresinous varnish base is still compatible with the selected vinyl resin and while the oleoresinous varnish base is free from the tendency to develop non-dispersible gel spots while in common solution with the selected vinyl resin and prior to extensive polymerization of the oleoresinous base; said vinyl resin being a copolymerized vinyl resin derived from a vinyl halide and vinyl acetate; and said oleoresinous base constituting from 5 to 50 percent of the total weight of the oleoresinous base and vinyl resin.

19. A coating composition comprising an oleoresinous varnish base, a polymerized vinyl resin, and a volatile organic solvent medium for said oleoresinous base and vinyl resin; said oleoresinous base being a heat-polymerizable product, compatible with the selected vinyl resin and formed by the interassociation of a drying oil and an oil-soluble varnish resin selected from the group consisting of phenol-aldehyde resins, natural resins, ester gum, glycerol-esterified copals, masticated copals, fused copals, phenolated copals, hydrogenated rosin, coumarone and indene resins, hydrogenated coumarone and indene resins, resinous reaction products of monomeric styrene and an oil-soluble phenol-aldehyde resin, oil-soluble hydrocarbon resins obtained by polymerization of olefin-diolefin fractions of cracked petroleum distillates, and oil-soluble dihydronaphthalene polymer resins through heating a solution of the oil-soluble resin in the drying oil at a temperature of substantially 300 to 350 degrees F. for substantially 1 to 6 hours; said drying oil and varnish resin being present in a proportion of essentially 1:4 to 2:1; the selected varnish resin and vinyl resin being compatible with one another, said heating having been terminated while the oleoresinous varnish base is still compatible with the selected vinyl resin and while the oleoresinous varnish base is free from the tendency to develop non-dispersible gel spots while in common solution with the selected vinyl resin and prior to extensive polymerization of the oleoresinous base; said vinyl resin being a copolymerized vinyl resin derived in major part from vinyl chloride and in minor part from vinyl acetate; and said oleoresinous base constituting from 5 to 50 percent of the total weight of the oleoresinous base and vinyl resin.

20. A coating composition comprising an oleoresinous varnish base, a polymerized vinyl resin, and a volatile organic solvent medium for said oleoresinous base and vinyl resin; said oleoresinous base being a heat-polymerizable product compatible with the selected vinyl resin and formed by the interassociation of a drying oil and an oil-soluble phenol-aldehyde varnish resin through heating a solution of the oil-soluble resin in the drying oil at a temperature of substantially 300 to 350 degrees F. for substantially 1 to 6 hours; said drying oil and varnish resin being present in a proportion of essentially 1:4 to 2:1, the selected varnish resin and vinyl resin being compatible with one another, said heating having been terminated while the oleoresinous varnish base is still compatible with the selected vinyl resin and while the oleoresinous varnish base is free from the tendency to develop non-dispersible gel spots while in common solution with the selected vinyl resin and prior to extensive polymerization of the oleoresinous base; said vinyl resin being a copolymerized vinyl resin derived from a vinyl halide and vinyl acetate; and said oleoresinous base constituting from 5 to 50 percent of the total weight of the oleoresinous base and vinyl resin.

21. A coating composition comprising an oleoresinous varnish base, a polymerized vinyl resin, and a volatile organic solvent medium for said oleoresinous base and vinyl resin; said oleoresinous base being a heat-polymerizable product, compatible with the selected vinyl resin and formed by the interassociation of a drying oil and an oil-soluble resinous reaction product of monomeric styrene and an oil-soluble phenol-aldehyde resin through heating a solution of the oil-soluble resin in the drying oil at a temperature of substantially 300 to 350 degrees F. for substantially 1 to 6 hours; said drying oil and varnish resin being present in a proportion of essentially 1:4 to 2:1; the selected varnish resin and vinyl resin being compatible with one another, said heating having been terminated while the oleoresinous varnish base is still compatible with the selected vinyl resin and while the oleoresinous varnish base is free from the tendency to develop non-dispersible gel spots while in common solution with the selected vinyl resin and prior to extensive polymerization of the oleoresinous base; said vinyl resin being a copolymerized vinyl resin derived from a vinyl halide and vinyl acetate; said oleoresinous base constituting from 5 to 50 percent of the total weight of the oleoresinous base and vinyl resin.

22. A coating composition comprising an oleoresinous varnish base, a polymerized vinyl resin, and a volatile organic solvent medium for said oleoresinous base and vinyl resin; said oleoresinous base being a heat-polymerizable product, compatible with the selected vinyl resin and formed by the interassociation of a drying oil and an oil-soluble hydrocarbon resin obtained by polymerization of olefin-diolefin fractions of cracked petroleum distillates through heating a solution of the oil-soluble resin in the drying oil at a temperature of substantially 300 to 350 degrees F. for substantially 1 to 6 hours; said drying oil and varnish resin being present in a proportion of essentially 1:4 to 2:1; the selected varnish resin and vinyl resin being compatible with one another, said heating having been terminated while the oleoresinous varnish base is still compatible with the selected vinyl resin and while the oleoresinous varnish base is free from the tendency to develop non-dispersible gel spots while in common solution with the selected vinyl resin and prior to extensive polymerization of the oleoresinous base; said vinyl resin being a copolymerized vinyl resin derived from a vinyl halide and vinyl acetate; and said oleoresinous base constituting from 5 to 50 percent of the total weight of the oleoresinous base and vinyl resin.

23. A coating composition comprising an oleoresinous varnish base, a polymerized vinyl resin, and a volatile organic solvent medium for said oleoresinous base and vinyl resin; said oleoresinous base being a heat-polymerizable product, compatible with the selected vinyl resin and formed by the interassociation of a drying oil having at least two conjugated double bonds in an acid radical and an oil-soluble phenol-aldehyde varnish resin through heating a solution of the oil-soluble resin in the drying oil at a temperature of substantially 300 to 350 degrees F. for substantially 1 to 6 hours; said drying oil and varnish resin being present in a proportion of essentially 1:4 to 2:1; the selected varnish resin and vinyl resin being compatible with one another; said heating having been terminated while the oleoresinous varnish base is still compatible with the selected vinyl resin and while the oleoresinous varnish base is free from the tendency to develop non-dispersible gel spots while in common solution with the selected vinyl resin and prior to extensive polymerization of the oleoresinous base; said vinyl resin being a copolymerized vinyl resin derived from a vinyl halide and vinyl acetate; and said oleoresinous base constituting from 5 to 50 percent of the total weight of the oleoresinous base and vinyl resin.

24. A coating composition comprising an oleoresinous varnish base, a polymerized vinyl resin, and a volatile organic solvent medium for said oleoresinous base and vinyl resin; said oleoresinous base being a heat-polymerizable product, compatible with the selected vinyl resin and formed by the interassociation of a drying oil having at least two conjugated double bonds in an acid radical and an oil-soluble resinous reaction product of monomeric styrene and an oil-soluble phenol-aldehyde resin through heating a solution of the oil-soluble resin in the drying oil at a temperature of substantially 300 to 350 degrees F. for substantially 1 to 6 hours; said drying oil and varnish resin being present in a proportion of essentially 1:4 to 2:1; the selected varnish resin and vinyl resin being compatible with one another; said heating having been terminated while the oleoresinous varnish base is still compatible with the selected vinyl resin and while the oleoresinous varnish base is free from the tendency to develop non-dispersible gel spots while in common solution with the selected vinyl resin and prior to extensive polymerization of the oleoresinous base; said vinyl resin being a copolymerized vinyl resin derived from a vinyl halide and vinyl acetate; and said oleoresinous base constituting from 5 to 50 percent of the total weight of the oleoresinous base and vinyl resin.

25. A coating composition comprising an oleoresinous varnish base, a polymerized vinyl resin, and a volatile organic solvent medium for said oleoresinous base and vinyl resin; said oleoresinous base being a heat-polymerizable product, compatible with the selected vinyl resin and formed by the interassociation of a drying oil having at least two conjugated double bonds in an acid radical and an oil-soluble hydrocarbon resin obtained by polymerization of olefin-diolefin fractions of cracked petroleum distillates through heating a solution of the oil-soluble resin in the drying oil at a temperature of substantially 300 to 350 degrees F. for substantially 1 to 6 hours; said drying oil and varnish resin being present in a proportion of essentially 1:4 to 2:1; the selected varnish resin and vinyl resin being compatible with one another, said heating having been terminated while the oleoresinous varnish base is still compatible with the selected vinyl resin and while the oleoresinous varnish base is free from the tendency to develop non-dispersible gel spots while in common solution with the selected vinyl resin and prior to extensive polymerization of the oleoresinous base; said vinyl resin being a copolymerized vinyl resin derived from a vinyl halide and vinyl acetate; and said oleoresinous base constituting from 5 to 50 percent of the total weight of the oleoresinous base and vinyl resin.

26. A coating composition comprising an oleoresinous varnish base, a polymerized vinyl resin, and a volatile organic solvent medium for said oleoresinous base and vinyl resin; said oleoresinous base being a heat-polymerizable product, compatible with the selected vinyl resin and formed by the interassociation of a drying oil and an oil-soluble non-heat-hardening phenylphenol-aldehyde resin through heating a solution of the oil-soluble resin in the drying oil at a temperature of substantially 300 to 350 degrees F. for substantially 1 to 6 hours; said drying oil and varnish resin being present in a proportion of essentially 1:4 to 2:1; the selected varnish resin and vinyl resin being compatible with one another, said heating having been terminated while the oleoresinous varnish base is still compatible with the selected vinyl resin and while the oleoresinous varnish base is free from the tendency to develop non-dispersible gel spots while in common solution with the selected vinyl resin and prior to extensive polymerization of the oleoresinous base; said vinyl resin being a copolymerized vinyl resin derived from a vinyl halide and vinyl acetate; and said oleoresinous base constituting from 5 to 50 percent of the total weight of the oleoresinous base and vinyl resin.

27. A coating composition comprising an oleoresinous varnish base, a vinyl resin, and a volatile organic solvent medium for said oleoresinous base and vinyl resin; said oleoresinous base being a heat-polymerizable product, compatible with the selected vinyl resin and formed by the interassociation of a drying oil having at least two conjugated double bonds in an acid radical and an oil-soluble non-heat-hardening phenylphenol-aldehyde resin through heating a solution of the oil-soluble resin in the drying oil at a temperature of substantially 350 degrees F. for substantially 1 to 3 hours; said drying oil and varnish resin being present in a proportion of essentially 1:4 to 2:1; the selected varnish resin and vinyl resin being compatible with one another, said heating having been terminated while the oleoresinous varnish base is still compatible with the selected vinyl resin and while the oleoresinous varnish base is free from the tendency to develop non-dispersible gel spots while in common solution with the selected vinyl resin and prior to extensive polymerization of the oleoresinous base; said vinyl resin being a copolymerized vinyl resin derived from a vinyl halide and vinyl acetate; and said oleoresinous base constituting from 5 to 50 percent of the total weight of the oleoresinous base and vinyl resin.

28. A coating composition comprising an oleoresinous varnish base, a vinyl resin, and a volatile organic solvent medium for said oleoresinous base and vinyl resin; said oleoresinous base being a heat-polymerizable product, compatible with the selected vinyl resin and formed by the interassociation of a drying oil having at least two conjugated double bonds in an acid radical and an oil-soluble resinous reaction product of monomeric styrene and an oil-soluble phenol-aldehyde resin through heating a solution of the oil-soluble resin in the drying oil at a temperature of substantially 350 degrees F. for substantially one to three hours; said drying oil and varnish resin being present in a proportion of essentially 1:4 to 2:1; the selected varnish resin and vinyl resin being compatible with one another, said heating having been terminated while the oleoresinous varnish base is still compatible with the selected vinyl resin and while the oleoresinous varnish base is free from the tendency to develop non-dispersible gel spots while in common solution with the selected vinyl resin and prior to extensive polymerization of the oleoresinous base; said vinyl resin being a copolymerized vinyl resin derived from a vinyl halide and vinyl acetate; and said oleoresinous base constituting from 5 to 50 percent of the total weight of the oleoresinous base and vinyl resin.

29. A coating composition comprising an oleoresinous varnish base, a vinyl resin, and a volatile organic solvent medium for said oleoresinous base and vinyl resin; said oleoresinous base being a heat-polymerizable product, compatible with the selected vinyl resin and formed by the interassociation of a drying oil having at least two conjugated double bonds in an acid radical and an oil-soluble hydrocarbon resin obtained by polymerization of olefin-diolefin fractions of cracked petroleum distillates through heating a solution of the oil-soluble resin in the drying oil at a temperature of substantially 350 degrees F. for substantially 1 to 3 hours; said drying oil and varnish resin being present in a proportion of essentially 1:4 to 2:1; the selected varnish resin and vinyl resin being compatible with one another, said heating having been terminated while the oleoresinous varnish base is still compatible with the selected vinyl resin and while the oleoresinous varnish base is free from the tendency to develop non-dispersible gel spots while in common solution with the selected vinyl resin and prior to extensive polymerization of the oleoresinous base; said vinyl resin being a copolymerized vinyl resin derived from a vinyl halide and vinyl acetate; and said oleoresinous base constituting from 5 to 50 percent of the total weight of the oleoresinous base and vinyl resin.

30. A coating composition comprising an oleoresinous varnish base, a vinyl resin, and a volatile organic solvent medium for said oleoresinous base and vinyl resin; said oleoresinous base being a heat-polymerizable product, compatible with the selected vinyl resin and formed by the interassociation of a drying oil having at least two conjugated double bonds in an acid radical and an oil-soluble non-heat-hardening phenylphenol-aldehdye resin through heating a solution of the oil-soluble resin in the drying oil at a temperature of substantially 350 degrees F. for substantially one to three hours; said drying oil and varnish resin being present in a proportion of essentially 1:4 to 2:1; the selected varnish resin and vinyl resin being compatible with one another, said heating having been terminated while the oleoresinous varnish base is still compatible with the selected vinyl resin and while the oleoresinous varnish base is free from the tendency to develop non-dispersible gel spots while in common solution with the selected vinyl resin and prior to extensive polymerization of the oleoresinous base; said vinyl resin being a copolymerized vinyl resin derived in major part from vinyl chloride and in minor part from vinyl acetate; and said oleoresinous base constituting from 5 to 50 percent of the total weight of the oleoresinous base and vinyl resin.

31. A coating composition comprising an oleoresinous varnish base, a vinyl resin, and a volatile organic solvent medium for said oleoresinous base and vinyl resin; said oleoresinous base being a heat-polymerizable product, compatible with the selected vinyl resin and formed by the interassociation of a drying oil having at least two conjugated double bonds in an acid radical and an oil-soluble resinous reaction product of monomeric styrene and an oil-soluble phenol-aldehyde resin through heating a solution of the oil-soluble resin in the drying oil at a temperature of substantially 350 degrees F. for substantially 1 to 3 hours; said drying oil and varnish resin being present in a proportion of essentially 1:4 to 2:1; the selected varnish resin and vinyl resin being compatible with one another, said heating having been terminated while the oleoresinous varnish base is still compatible with the selected vinyl resin and while the oleoresinous varnish base is free from the tendency to develop non-dispersible gel spots while in common solution with the selected vinyl resin and prior to extensive polymerization of the oleoresinous base; said vinyl resin being a copolymerizd vinyl resin derived in major part from vinyl chloride and in minor part from vinyl acetate; and said oleoresinous base constituting from 5 to 50 percent of the total weight of the oleoresinous base and vinyl resin.

32. A coating composition comprising an oleoresinous varnish base, a vinyl resin, and a volatile organic solvent medium for said oleoresinous base and vinyl resin; said oleoresinous base being a heat-polymerizable product, compatible with the selected vinyl resin and formed by the interassociation of a drying oil having at least two conjugated double bonds in an acid radical and an oil-soluble hydrocarbon resin obtained by polymerization of olefin-diolefin fractions of cracked petroleum distillates through heating a solution of the oil-soluble resin in the drying oil at a temperature of substantially 350 degrees F. for substantially one to three hours; said drying oil and varnish resin being present in a proportion of essentially 1:4 to 2:1; the selected varnish resin and vinyl resin being compatible with one another, said heating having been terminated while the oleoresinous varnish base is still compatible with the selected vinyl resin and while the oleoresinous varnish base is free from the tendency to develop non-dispersible gel spots while in common solution with the selected vinyl resin and prior to extensive polymerization of the oleoresinous base; said vinyl resin being a copolymerized vinyl resin derived in major part from vinyl chloride and in minor part from vinyl acetate; and said oleoresinous base constituting from 5 to 50 percent of the total weight of the oleoresinous base and vinyl resin.

33. A coating composition comprising an oleoresinous varnish base, a vinyl resin, and a volatile organic solvent medium for said oleoresinous base and vinyl resin; said oleoresinous base being a heat-polymerizable product, compatible with the selected vinyl resin and formed by the interassociation of China-wood oil and an oil-soluble non-heat-hardening phenylphenol aldehyde resin through heating a solution of the oil-soluble resin in the drying oil at a temperature of substantially 350 degrees F. for substantially 3 hours; said drying oil and varnish resin being present in a proportion of essentially 1:1; the selected varnish resin and vinyl resin being compatible with one another, said heating having been terminated while the oleoresinous varnish base is still compatible with the selected vinyl resin and while the oleoresinous varnish base is free from the tendency to develop non-dispersible gel spots while in common solution with the selected vinyl resin and prior to extensive polymerization of the oleoresinous base; said vinyl resin being a copolymerized vinyl resin consisting of approximately 87 percent vinyl chloride and 13 percent vinyl acetate; said solvent medium being a mixture containing about 70 percent xylol and about 30 percent isophorone; and the coating composition containing about 350 parts, by weight, of said solvent medium, about 20 parts, by weight of said oleoresinous base and about 80 parts, by weight, of said vinyl resin.

34. A coating composition comprising an oleoresinous varnish base, a vinyl resin, and a volatile organic solvent medium for said oleoresinous base and vinyl resin; said oleoresinous base being a heat-polymerizable product, compatible with the selected vinyl resin and formed by the interassociation of China-wood oil and an oil-soluble resinous reaction product of monomeric styrene and an oil-soluble phenol-aldehyde resin through heating a solution of the oil-soluble resin in the drying oil at a temperature of substantially 350 degrees F. for substantially 2½ hours; said drying oil and varnish resin being present in a proportion of essentially 1:1; the selected varnish resin and vinyl resin being compatible with one another, said heating having been terminated while the oleoresinous varnish base is still compatible with the selected vinyl resin and while the oleoresinous varnish base is free from the tendency to develop non-dispersible gel spots while in common solution with the selected vinyl resin and prior to extensive polymerization of the oleoresinous base; said vinyl resin being a copolymerized vinyl resin consisting of approximately 87 percent vinyl chloride and 13 percent vinyl acetate; said solvent medium being a mixture containing about 70 percent xylol and about 30 percent isophorone; the coating composition containing about 350 parts by weight of said solvent medium, about 20 parts by weight of said oleoresinous base, and about 80 parts by weight of said vinyl resin.

35. An article comprising a base and thereon a unitary protective film consisting of the stratified baked residue of a coating composition comprising a solution in a volatile organic solvent of an oleoresinous base and a polymerized vinyl resin, said oleoresinous base being a heat-polymerizable product compatible with the selected vinyl resin and formed by the interassociation of a drying oil and an oil-soluble varnish resin selected from the group consisting of phenol-aldehyde resins, natural resins, ester gum, glycerol-esterified copals, masticated copals, fused copals, phenolated copals, hydrogenated rosin, cumarone and indene resins, hydrogenated cumarone and indene resins, resinous reaction products of monomeric styrene and an oil-soluble phenol-aldehyde, oil-soluble hydrocarbon resins obtained by polymerization of olefin-diolefin fractions of cracked petroleum distillates, and oil-soluble dihydronaphthalene polymer resins through heating a solution of the oil-soluble resin in the drying oil at a temperature of substantially 300 to 350 degrees F. for substantially 1 to 6 hours; said drying oil and varnish resin being present in a proportion of essentially 1:4 to 2:1; the selected varnish resin and vinyl resin being compatible with one another; said heating having been terminated while the oleoresinous varnish base is still compatible with the selected vinyl resin, while the oleoresinous varnish base is free from the tendency to develop non-dispersible gel spots while in common solution with the selected vinyl resin, and prior to extensive polymerization of the oleoresinous base; said vinyl resin being selected from the group consisting of the copolymers and mixed polymers derived from a vinyl halide and vinyl acetate; said oleoresinous base constituting from 5 to 50 percent of the total weight of the oleoresinous base and vinyl resin; and said film having a contact with and adherent to the article base a surface characteristic of the heat-polymerized oleoresinous varnish base and having an exposed surface characteristic of the polymerized vinyl resin.

36. An article having a metal surface and thereon a unitary protective film consisting of the stratified baked residue of a coating composition comprising a solution in a volatile organic solvent of an oleoresinous base and a polymerized vinyl resin, said oleoresinous base being a heat-polymerizable product compatible with the selected vinyl resin and formed by the interassociation of a drying oil and an oil-soluble varnish resin selected from the group consisting of phenol-aldehyde resins, natural resins, ester gum, glycerol-esterified copals, masticated copals, fused copals, phenolated copals, hydrogenated rosin, cumarone and indene resins, hydrogenated cumarone and indene resins, resinous reaction products of monomeric styrene and an oil-soluble phenol-aldehyde resin, oil-soluble hydrocarbon resins obtained by polymerization of olefin-diolefin fractions of cracked petroleum distillates, and oil-soluble dihydronaphthalene polymer resins through heating a solution of the oil-soluble resin in the drying oil at a temperature of substantially 300 to 350 degrees F. for substantially 1 to 6 hours; said drying oil and varnish resin being present in a proportion of essentially 1:4 to 2:1; the selected varnish resin and vinyl resin being compatible with one another; said heating having been terminated while the oleoresinous varnish base is still compatible with the selected vinyl resin, while the oleoresinous varnish base is free from the tendency to develop non-dispersible gel spots while in common solution with the selected vinyl resin, and prior to extensive polymerization of the oleoresinous base; said vinyl resin being selected from the group consisting of the copolymers and mixed polymers derived from a vinyl halide and vinyl acetate; said oleoresinous base constituting from 5 to 50 percent of the total weight of the oleoresinous base and vinyl resin; and said film having a metal-contacting and metal-adherent surface characteristic of the heat-polymerized oleoresinous varnish base and having an exposed surface characteristic of the polymerized vinyl resin.

37. A metal container having a surface thereof provided with a unitary protective film consisting of the stratified baked residue of a coating composition comprising a solution in a volatile organic solvent of an oleoresinous base and a polymerized vinyl resin, said oleoresinous base being a heat-polymerizable product compatible with the selected vinyl resin and formed by the interassociation of a drying oil and an oil-soluble varnish resin selected from the group consisting of phenol-aldehyde resins, natural resins, ester gum, glycerol-esterified copals, masticated copals, fused copals, phenolated copals, hydrogenated rosin, cumarone and indene resins, hydrogenated cumarone and indene resins, resinous reaction products of monomeric styrene and an oil-soluble phenol-aldehyde resins, oil-soluble hydrocarbon resins obtained by polymerization of olefin-diolefin fractions of cracked petroleum distillates, and oil-soluble dihydronaphthalene polymer resins through heating a solution of the oil-soluble resin in the drying oil at a temperature of substantially 300 to 350 degrees F. for substantially 1 to 6 hours; said drying oil and varnish resin being present in a proportion of essentially 1:4 to 2:1; the selected varnish resin and vinyl resin being compatible with one another; said heating having been terminated while the oleoresinous varnish base is still compatible with the selected vinyl resin, while the oleoresinous varnish base is free from the tendency to develop non-dispersible gel spots while in common solution with the selected vinyl resin, and prior to extensive polymerization of the oleoresinous base; said vinyl resin being selected from the group consisting of the copolymers and mixed polymers derived from a vinyl halide and vinyl acetate; said oleoresinous base constituting from 5 to 50 percent of the total weight of the oleoresinous base and vinyl resin; and said film having a metal-contacting and metal-adherent surface characteristic of the heat-polymerized oleoresinous varnish base and having an exposed surface characteristic of the polymerized vinyl resin.

38. A closure having a metal surface thereof provided with a unitary protective film consisting of the stratified baked residue of a coating composition comprising a solution in a volatile organic solvent of an oleoresinous base and a polymerized vinyl resin, said oleoresinous base being a heat-polymerizable product compatible with the selected vinyl resin and formed by the interassociation of a drying oil and an oil-soluble varnish resin selected from the group consisting of phenol-aldehyde resins, natural resins, ester gum, glycerol-esterified copals, masticated copals, fused copals, phenolated copals, hydrogenated rosin, cumarone and indene resins, hydrogenated cumarone and indene resins, resinous reaction products of monomeric styrene and an oil-soluble phenol-aldehyde, oil soluble hydrocarbon resins obtained by polymerization of olefin-diolefin fractions of cracked petroleum distillates, and oil-soluble dihydronaphthalene polymer resins through heating a solution of the oil-soluble resin in the drying oil at a temperature of substantially 300 to 350 degrees F. for substantially 1 to 6 hours; said drying oil and varnish resin being present in a proportion of essentially 1:4 to 2:1; the selected varnish resin and vinyl resin being compatible with one another; said heating having been terminated while the oleoresinous varnish base is still compatible with the selected vinyl resin, while the oleoresinous varnish base is free from the tendency to develop non-dispersible gel spots while in common solution with the selected vinyl resin, and prior to extensive polymerization of the oleoresinous base; said vinyl resin being selected from the group consisting of the copolymers and mixed polymers derived from a vinyl halide and vinyl acetate; said oleoresinous base constituting from 5 to 50 percent of the total weight of the oleoresinous base and vinyl resin; and said film having a metal-contacting and metal-adherent surface characteristic of the heat-polymerized oleoresinous varnish base and having an exposed surface characteristic of the polymerized vinyl resin.

39. The process of providing a metal surface with a unitary protective film having an oleoresinous metal-adherent portion and a vinyl resin exposed portion, which comprises heating a drying oil and having dissolved therein an oil-soluble varnish resin selected from the group consisting of phenol-aldehyde resins, natural resins, ester gum, glycerol-esterified copals, masticated copals, fused copals, phenolated copals, hydrogenated rosin, cumarone and indene resins, hydrogenated cumarone and indene resins, resinous reaction products of monomeric styrene and an oil-soluble phenol-aldehyde resin, oil-soluble hydrocarbon resins obtained by polymerization of olefin-diolefin fractions of cracked petroleum distillates, and oil-soluble dihydronaphthalene polymer resins in proportions of oil:varnish resin of essentially 1:4 to 2:1 for substantially 1 to 6 hours at a temperature of substantially 300 to 350 degrees F.; the selected varnish resin and the selected vinyl resin being compatible with one another; said heating being effective to produce an interassociation of the oil and varnish resins for providing a strongly polar-negative oleoresinous varnish base; said heating being terminated while the oleoresinous varnish base is still compatible with the selected vinyl resin, while the oleoresinous varnish base is free from the tendency to develop non-dispersible gel spots while in common solution with the selected vinyl resin, and prior to extensive polymerization of the oleoresinous base; thinning said base with a volatile organic solvent; mixing with a solution of a polymerized vinyl resin selected from the group consisting of the copolymers and mixed polymers derived from a vinyl halide and vinyl acetate; said oleoresinous base constituting from 5 to 50 percent of the total weight of the oleoresinous base and vinyl resin; applying a coating of the mixed solution to the metal surface; evaporating the solvent medium, and baking the solids as a stratified lacquer film having a metal-contacting and metal-adherent surface characteristic of the heat-polymerized oleoresinous varnish base and an exposed surface characteristic of the polymerized vinyl resin; the polar charges being effective prior to the completion of the baking to cause the migration of the resin materials to produce the stratification in the film.

CURTIS E. MAIER.
SYLVESTER L. FLUGGE.
EDWARD C. PFEFFER.